United States Patent
Sigler et al.

(10) Patent No.: US 8,525,066 B2
(45) Date of Patent: Sep. 3, 2013

(54) ELECTRODE FOR SPOT WELDING

(75) Inventors: David R. Sigler, Shelby Township, MI (US); James G. Schroth, Troy, MI (US); Michael J. Karagoulis, Okemos, MI (US)

(73) Assignee: GM Global Technology Operations LLC, Detroit, MI (US)

(*) Notice: Subject to any disclaimer, the term of this patent is extended or adjusted under 35 U.S.C. 154(b) by 343 days.

(21) Appl. No.: 12/436,192

(22) Filed: May 6, 2009

(65) Prior Publication Data

US 2009/0302009 A1    Dec. 10, 2009

Related U.S. Application Data

(60) Provisional application No. 61/058,701, filed on Jun. 4, 2008.

(51) Int. Cl.
*B23K 11/30* (2006.01)

(52) U.S. Cl.
USPC .............................. 219/119; 219/117.1; 72/71

(58) Field of Classification Search
USPC ..................... 219/92, 93, 94, 117.1, 118, 119
See application file for complete search history.

(56) References Cited

U.S. PATENT DOCUMENTS

| | | | | |
|---|---|---|---|---|
| 1,052,193 | A * | 2/1913 | Vogt | 72/476 |
| 1,303,919 | A * | 5/1919 | Lachman | 219/119 |
| 2,379,187 | A * | 6/1945 | Richards | 219/119 |
| 2,468,647 | A * | 4/1949 | Watter | 219/119 |
| 4,591,687 | A * | 5/1986 | Urech | 219/93 |
| 5,155,320 | A * | 10/1992 | Simmons | 219/120 |
| 5,304,769 | A * | 4/1994 | Ikegami et al. | 219/119 |
| 6,861,609 | B2 | 3/2005 | Sigler | |
| 8,274,010 | B2 | 9/2012 | Sigler et al. | |
| 2005/0211677 | A1* | 9/2005 | Chen | 219/117.1 |
| 2008/0078749 | A1 | 4/2008 | Sigler | |
| 2009/0127232 | A1* | 5/2009 | Sigler et al. | 219/117.1 |
| 2009/0255908 | A1* | 10/2009 | Sigler et al. | 219/91.2 |
| 2010/0258536 | A1* | 10/2010 | Sigler et al. | 219/117.1 |

* cited by examiner

*Primary Examiner* — Brian Jennison
(74) *Attorney, Agent, or Firm* — Reising Ethington P.C.

(57) ABSTRACT

Spot welding electrodes with generally dome shaped welding faces are provided with surface features for welding both aluminum alloy sheet assemblies and steel sheet assemblies. A raised circular plateau is formed on the central axis of the dome and, in one embodiment, a suitable number of round bumps are formed in concentric spacing from adjacent the circumference of the plateau toward the circular edge of the welding face. For welding steel workpieces the plateau mainly serves as the engaging feature of the electrode. Both the plateau and concentric bumps are used in penetrating light metal surfaces for suitable current passage. In another embodiment, the domed surface is shaped with concentric terraces for engagement with the workpieces.

14 Claims, 2 Drawing Sheets

ELECTRODE FOR SPOT WELDING

This application claims priority based on provisional application 61/058,701, titled "Electrode for Spot Welding," filed Jun. 4, 2008 and which is incorporated herein by reference.

TECHNICAL FIELD

This invention pertains to welding electrode face designs for forming spot welds in a succession of aluminum alloy sheet assemblies or in a succession of alternating aluminum alloy sheet assemblies and steel alloy sheet assemblies. In another embodiment, this invention pertains to an electrode face design that is particularly effective for welding aluminum sheet assemblies and is easily re-dressed for continued use.

BACKGROUND OF THE INVENTION

There is interest in welding of aluminum-to-aluminum sheet assemblies and steel-to-steel sheet assemblies on the same manufacturing line. A prototypical application might be a single automotive vehicle door fabrication line used to process all-aluminum doors and all-steel doors in subsequent batches. Although one approach to that need would be to maintain substantial redundant systems in parallel, i.e. steel welding robots/equipment alongside aluminum joining robots/equipment, another approach would be to use one set of robots and change from steel welding equipment to aluminum joining equipment, i.e., clinch, rivet, or weld guns, and a third approach would be to develop equipment, especially welding electrodes, which could weld either material with only modest transitioning requirements.

In this work it is assumed that medium-frequency direct current (MFDC) weld controls and transformers could be installed with capabilities to weld either aluminum sheet assemblies or steel sheet assemblies with only weld schedule variations (including weld force) required between the two processes. However, different spot welding electrodes are currently used for aluminum and steel welding, respectively, and it is not presently possible to alternately weld aluminum sheet assemblies and steel sheet assemblies using the same welding electrodes on an existing production line.

It is one object of this invention to provide a single electrical resistance welding electrode design that is suitable for spot welding of two or more steel alloy sheets as they are presented for welding and for spot welding of two or more aluminum alloy sheets when they are to be welded. Further, that electrode geometry can be maintained by a single electrode face dressing system that provides longer life for both the electrodes and the electrode face dressing tools.

There is also a need for an electrode design and dressing process that prepares electrodes for welding either light metals such as aluminum alloy and magnesium alloy sheets or steel sheets. The high electrical and thermal conductivity of aluminum and magnesium alloys in combination with the insulating nature of the naturally-formed surface oxide of these materials makes them difficult to resistance spot weld using conventional spot welding practice. The spot welding process is sensitive to a large number of variables beyond the normal welding parameters of electrode configuration, electrode force, weld time, and weld current. These other variables include sheet surface oxidation, sheet surface cleanliness, sheet surface topography as well as process variations such as alignment of the electrodes to the sheet, location of electrodes relative to the sheet edge and part radius, metal fit up, gun stiffness, alignment of electrodes on the gun, electrode surface roughness, and wear of the electrode surface.

Further, for a typical automotive closure such as a side door, the material thickness of the aluminum or magnesium component for comparable panels (e.g., a door inner panel) is larger. For a comparably sized door, an aluminum inner door panel would likely be about 25%-75% thicker than a steel inner door panel. Similarly, an aluminum outer door panel would likely be about 25%-75% thicker than a steel outer door panel. Also, aluminum door reinforcements would also be 25%-75% thicker. Thus, a single electrode geometry intended to weld both aluminum and steel components on the same assembly line must be capable of welding stackups of aluminum that are substantially thicker than the comparable stackups of steel.

Dressing processes that machine the surfaces of spot welding electrodes have been used previously for spot welding steel sheet for closures and structures, and aluminum sheet for closures. The dressing process has significant advantages that include 1) initial machining of the two electrodes into nearly perfect alignment with each other, 2) cleaning of any buildup on the electrode welding face from reaction with the sheet, 3) reshaping the electrode into the correct geometry if the electrode shape was altered by erosion (aluminum welding) or mushrooming (steel welding), and 4) machining a new face into the electrode with a different geometry or different orientation than it originally had. Some previous electrode designs have experienced wear patterns that require extensive reshaping of the worn electrode face. The extensive reshaping requires the removal of a relatively large portion of the welding surface of the electrode and shortens its useful life.

It is a further object of this invention to provide spot welding electrode designs that enable the formation of structural spot welds in highly conductive metal sheets and require less material removal during periodic re-dressing of the electrode thus extending the useful working life of the electrode.

SUMMARY OF THE INVENTION

This invention provides spot weld electrodes with welding faces shaped for specific purposes.

In a first embodiment of the invention, the welding electrode is shaped for forming spot welds in a series of sheet metal workpieces which may include, in alternate groupings, one or more workpiece assemblies of aluminum alloy sheets and one or more workpiece assemblies of steel sheets. Pairs of such welding electrodes in an axially aligned and weld-face-opposing attitude may be secured and used in robotic or other suitable movable or fixed equipment on a welding line that receives and accommodates both such aluminum sheet metal and steel sheet metal workpieces to be welded. The electrical resistance spot welding electrodes would typically be used in combination with an electrical power delivery system and welding current control system for providing a alternating welding current or direct welding current of suitable power level and duration.

The welding electrodes of this invention are typically made of copper-base alloys with suitable electrical conductivity and strength to resist weld force application when pressed against outer opposing surfaces of assembled sheets or other workpieces shaped to be welded together. Each electrode comprises an interfacing portion that is sized and shaped for attachment to a shank portion of a welding machine for current delivery. Attached to the shank (occasionally integral with it) is the body of the electrode which terminates in the welding face portion of the electrode. The body of the electrode is often a round cylinder that extends from the longitudinal axis of the shank. The diameter of the body is often about 12.7 millimeters to about 22.2 mm. The unattached end of the round body has the shape of a truncated cone or truncated sphere with the truncated face of the cone or sphere being flat or dome-shaped. It is this face of the electrode body that engages surfaces of workpieces to be welded. In accordance with this invention, specific generally circular shapes are formed in the domed portion of the electrode face to accomplish the stated objects and purposes of the invention.

The dome has a partially spherical shape centered approximately on the longitudinal axis of the electrode and with a predetermined radius of curvature. By way of example, the radius of curvature of the dome may be about 25 mm and is suitably in the range of about 20 mm to about 40 mm. The planar diameter (i.e., the diameter of the dome as seen in plan view looking at the face of the electrode) may be about 6 mm to about 12 mm with the edge of the dome merging with the conical surface or spherical surface at the end of the electrode body. Shaped features are formed in the dome surface with a machining tool. A shaping tool containing the surface shape features may be used to re-dress or restore such shape features in the face of an electrode worn from repeated welding operations. The shaping tool often has a cutting edge that is rotated relative to the dome surface to machine generally circular welding surface features in the weld surface contacting face of the electrode.

The dome on the electrode face has a round plateau centered on the axis of the electrode face. In an illustrative embodiment the surface of the plateau stands about 0.24 mm above the base surface of the dome. The surface of the plateau is a segment of a sphere having a radius of curvature (e.g., 50 mm radius of curvature) greater than the radius of curvature of the dome surface. Thus, the curvature of the plateau is less that that of the base surface of the dome. The plateau may be machined to provide a surface texture for aluminum spot welding such as a circular shallow groove or several concentric grooves beginning near its circumference and extending towards its center. This plateau is designed to be a principal contacting surface of the welding electrode with a steel surface in forming a spot weld between steel workpieces. As stated, the plateau with its textured surface is also utilized in forming a spot weld between aluminum workpieces.

Two or more concentric, circular contact features are formed on the dome surface outside the circumference of the plateau. These circular upward protrusions or ridges may be generally rounded in cross-section and extend upwardly about 0.12 mm from the base surface of the dome, less than the height of the plateau. These concentric circular features are formed on the dome surface between the outer circumference of the plateau and outer conical or spherical side surface of the dome. When the electrode is used in welding aluminum alloy workpieces it is intended that both the uplifted plateau and surrounding circular ridges will engage and penetrate the aluminum surface to penetrate any oxide layer and establish good electrical contact for resistance welding of the aluminum workpieces.

In some welding embodiments for aluminum and steel workpieces it may be satisfactory to simply provide a roughened (e.g., sand or grit blasted) surface on the circular plateau and surrounding dome surface. For example, such roughened features on either or both of the plateau and dome surfaces are characterized by randomly distributed craters with peak to valley dimensions (called roughness) in the range of about five to thirty micrometers and with substantially the same range of peak to peak spacing. The structural features of these roughened plateau and dome surfaces are somewhat smaller than machined protrusion or valley features but are suitable in some welding applications.

Still another embodiment of the invention may be of interest in forming spot welds in light metal alloy workpieces where it is desired to penetrate through oxide coatings and obtain substantial electrical contacts with the base metal of the work pieces. In this embodiment, a round central plateau or terrace is formed centered approximately on the central axis of the electrode dome, however, when required by a particular welding setup the plateau or terrace may be formed away from the electrode centerline. A suitable number of additional round annular terraces are formed of progressively larger diameters from the circumference of the central plateau or terrace. The step-wise lower terraces are formed on the dome proceeding toward the conical side surface of the electrode face. The upper surfaces of the terraces may be flat or have some spherical convex curvature like that of the base dome. The upper circular edges of the respective terraces are preferably rounded. But the descending round side surface of each terrace may engage the upper surface of the next larger terrace in a sharp corner. Such progressive annular terraces (except for the round central terrace) may follow the overall curvature of the dome and provide surface features for penetrating aluminum alloy surfaces in spot welding. At the same time the shape of the terraces is readily re-shaped when worn by welding operations by a weld face dressing tool with minimal removal of electrode material.

Other objects and advantages of the invention will be apparent from a disclosure provided by descriptions of illustrative embodiments.

DESCRIPTION OF PREFERRED EMBODIMENTS

Welding electrode face designs are provided that are useful for forming spot welds in metal workpieces. In a first embodiment of the invention a welding face design is provided that is effective in alternately welding all-aluminum sheet assemblies and all-steel sheet assemblies in a manufacturing line that includes both metal sheet assemblies. In a second embodiment of the invention a welding face design is provided that offers advantages for welding light metal workpieces such as aluminum alloy and magnesium alloy sheet materials and, after a period of welding operations, the worn welding face is effectively re-dressed with minimal removal of face material. Light metal workpieces often have an oxide film on surfaces contacted by the aligned and opposing electrodes and it is preferred that the electrode faces be shaped to engage and penetrate the oxide film during welding.

In the manufacture of passenger vehicle doors, deck lids, liftgates, and the like, for example, it is often the practice to form these assemblies from multiple component panels, including inner and outer sheet metal panels. Reinforcement panels are joined to the inner and outer panels in those locations that require additional strength or stiffness. The positioned reinforcements and formed panels are joined by a series of progressively formed electrical resistance spot welds in a joining pattern. In one type of welding operation, the assembled reinforcements and formed panels might be moved and positioned between the welding arms of a stationary pedestal welding machine (pedestal welding). In another type of welding operation, the panels might be held in a fixed position and a robot progressively move a welding gun around to sequentially form the welds (robotic welding). The inner and outer panels with reinforcements welded in place may have flanges at various locations for joining.

Figure 1:
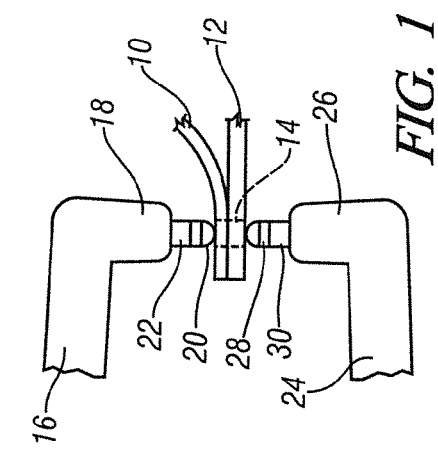
FIG. 1 is a schematic representation of aligned and opposing welding electrodes engaging assembled sheet metal panels for a resistance welding operation.

FIG. 1 illustrates a welding operation in which a spot weld is to be formed at a welding site 14 (shown as a dashed line weld nugget to be formed) in two juxtaposed metal alloy panels 10, 12 (only the overlapping edges of panels 10 and 12 are shown for simplification of the illustration). In a first embodiment of this invention, the panels may be either an assembly of aluminum alloy panels or of steel alloy panels. As will be described, a unique electrode face design is provided that is effective for welding either aluminum sheets (or other light metal sheets) or steel sheets, particularly for the situation when the aluminum material stackup thickness is substantially greater than the steel material stackup thickness. In a second embodiment of the invention the electrode face designs are particularly useful for welding light metal panels.

In either embodiment an upper welding gun arm 16 has an electrode holder 18 that holds welding electrode 20 in shank 22. The welding electrode is often water-cooled by means not illustrated. Welding gun arm 16 is part of a fixed welding apparatus or robot-carried welding apparatus, not shown. A lower welding arm 24 is also carried on the welding apparatus. Lower welding arm 24 has an electrode holder 26 that holds welding electrode 28 in shank 30.

Welding electrode 20 carried by the upper welding arm 16 is shown engaging the outer (upper in FIG. 1) surface of panel 10 and welding electrode 28 carried by lower welding arm 24 is shown engaging the outer (lower) surface of panel 12. In a spot welding operation, electrical current of suitable magnitude and duration is passed between the tips of opposing and aligned electrodes 20, 28 through the overlying panels 10, 12 at weld site 14. The electrodes 20, 28 are pressed together, suitably in a predetermined pressure schedule, to press the panels 10, 12 together at the weld site 14 to allow a suitable preprogrammed momentary current flow for resistance heating of the metal at the weld site 14. Metal in the current path is momentarily melted. The welding current is stopped; the molten metal rapidly loses heat to the water-cooled electrodes and the surrounding panel material and solidifies as a weld nugget joining panels 10, 12 at weld site 14. The opposing electrodes 20, 28 are then withdrawn.

This welding sequence is usually completed in less than one second. The panels or electrodes are moved to a nearby weld site and the process is repeated until a suitable predetermined number of spot welds are formed to secure panels 10 and 12. Then another workpiece assembly is brought into proximity of the welding apparatus and a new sequence of welds formed. As will be described, the electrode weld faces play a role in the formation of each weld and in the efficiency of the ongoing welding process.

In a first embodiment of the invention an electrode geometry is provided that is designed to be suitable for welding either an assembly of aluminum workpieces or steel workpieces, even when the thickness of the material stackups differs substantially for those two materials. Further the geometry should remain able to produce quality welds in either material even after substantial face wear. After a period of use, the face of an electrode is redressed by a suitable cutting tool to reshape the welding face. The electrode is expected to produce many welds before requiring redressing. Also, since a single geometry is used for both materials, a minimal amount of dressing will be needed to restore the proper electrode geometry which, in turn, should maximize the life of the electrode for the situation of repeated dressing events. The electrode has some characteristics of electrodes specifically chosen for welding either aluminum or steel, but provides a unique combination of features that have never been used before.

The new electrode face geometry was designed with projecting and recessed features. Reference is made to FIGS. 2-6 to illustrate these features in a representative welding electrode 20. The protrusions/intrusions in the electrode face are shaped and spaced to meet several requirements. First, it is preferred that they not cause excessive indentation into the sheet material. Excessive indentation or metal thinning, particularly at the outer edge of the weld nugget, will weaken the weld and/or surrounding sheet metal. For the design of the first embodiment of this invention, it was assumed that the thickness of steel sheets to be welded may be ~67% as thick as the thickness of aluminum sheets in an assembly to be welded (or the aluminum sheets are assumed to be 150% of the thickness of the steel sheets in the welding assemblies successively encountered by the welding electrodes). For a weld workpiece assembly consisting of two or more sheets, indentation occurs on the outer surfaces of the two outermost sheets. The amount of indentation is typically more important for the thinner of the two sheets, since that sheet is more highly stressed. In all cases of aluminum and steel welding, the indentation by the spot weld electrodes into the outer two sheet surfaces is preferably not greater than 50% of the sheet thickness. Preferably for aluminum spot welding, since aluminum is more notch sensitive than steel, the amount of indentation should not exceed 20% of the sheet thickness, at least at the outer edge of the fused and re-solidified weld nugget since that area controls the weld mechanical properties.

Figure 2:
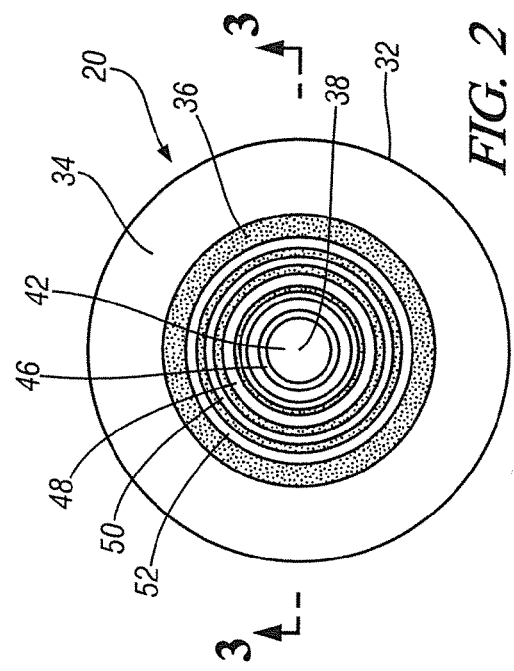
FIG. 2 is a plan view of one embodiment of a spot welding electrode face for welding both aluminum sheet assemblies and steel assemblies.
Figure 3:
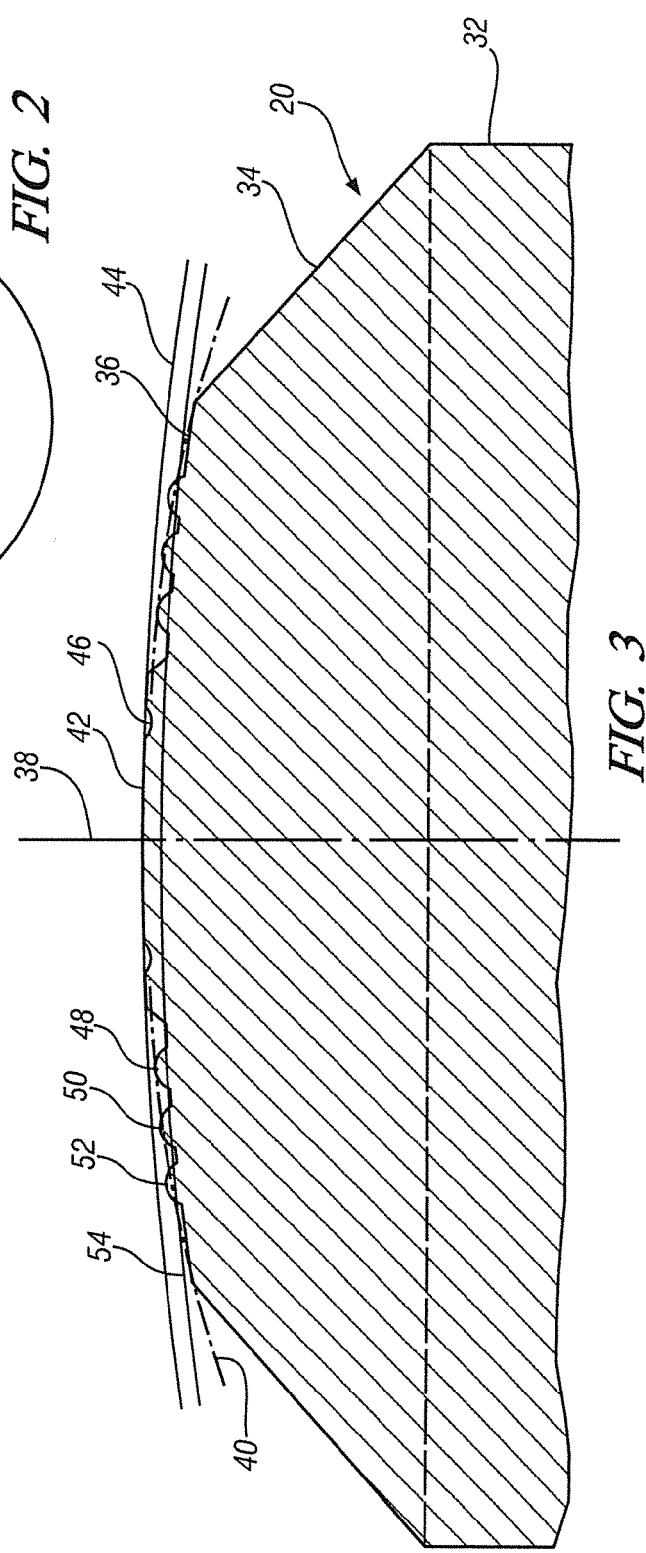
FIG. 3 is a first elevational view in cross-section of the working face of the spot welding electrode illustrated in FIG. 2. This view illustrates representative radii of curvature of portions of the electrode face.

As illustrated in FIGS. 2 and 3 (both enlarged for illustration), spot welding electrode 20 has a round cylindrical body 32 that terminates in a round conical welding tip 34 having a basically dome-shaped welding face 36. In this embodiment the base shape of welding face 36 is a portion of a surface of a sphere centered on the longitudinal axis 38 of electrode body 32 (and the axis of the spot weld force and operation). Arc line 40 in the cross-sectional view of FIG. 3 (not drawn to scale) shows the curvature of face 36, which in this example is about 25 millimeters.

Welding face 36 has a raised round plateau 42 that is centered on axis 38 and extends about 0.24 mm above the welding face 36. Plateau is round in plan view (FIG. 2) but has a spherical surface as indicated by arc line 44 in FIG. 3 with a spherical radius in this embodiment of about 50 mm. Thus, the radius of curvature of the plateau surface is greater than the overall radius of curvature 40 of the electrode face surface 36. Plateau 42 has a round recessed groove 46 with a rounded cross-section formed in its upper surface. Recessed groove extends about 0.08 mm below the surface of plateau 42. As will be described further, plateau 42 with its recessed groove 46 is used to allow welding of steel with local contact primarily over a minimal area of the electrode face.

Also centered on electrode axis 38 are three concentric round elevated protrusions 48, 50, 52 with progressively increasing diameters. In this embodiment, the elevated protrusions 48, 50, 52 have rounded cross-sections. The bases of protrusions 48, 50, 52 are on a spherical surface with about the same spherical radius (about 50 nm, arc line 54 in FIG. 3) as plateau 42. Outside the final raised protrusion 52, the face 36 of the electrode falls off at a smaller radius of curvature (arc line 40, radius about 25 mm) than the remainder of the face.

All features on the weld face, i.e., the central plateau, recessed circular groove or grooves, and elevated circular protrusions, must be designed such that the electrode can be lifted from the sheet material after welding without becoming locked into the sheet surface. For this reason, all these features must have no backdraft or negative draft relative to the longitudinal axis.

Figure 4:
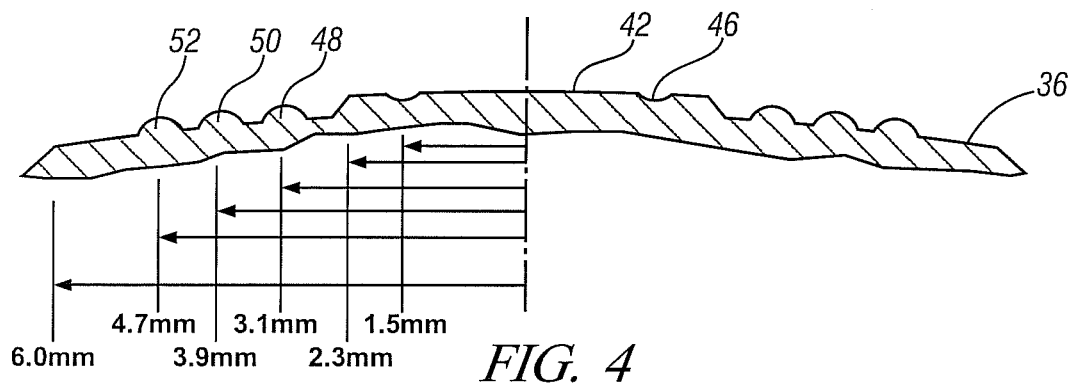
FIG. 4 is a second elevational view in cross-section of the working face of the spot welding electrode illustrated in FIG. 2. This view illustrates representative radii from the axis of the electrode of surface features of the electrode face.

FIG. 4 illustrates the radial location of the respective features of the electrode welding face from the axis 38 of the electrode. In this illustrative embodiment the radii of groove 46 is 1.5 mm and of the face of plateau 42 is 2.3 mm. The radii of the centers of protrusions 48, 50, and 52 are, respectively, 3.1 mm, 3.9 mm, and 4.7 mm. The radius of the outer edge of electrode face 36 is about 6 mm.

Figure 5:
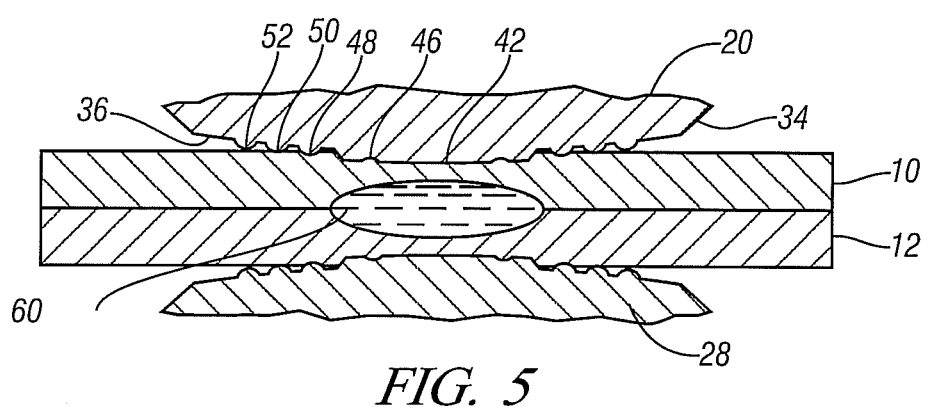
FIG. 5 is an elevational view in cross-section of two opposing spot weld electrodes engaging and forming a weld nugget in two overlying steel sheets each 1.3 mm thick. The electrodes each have the face design illustrated in FIGS. 2-4.

In FIG. 5, opposing and aligned welding electrodes 20, 28 are engaging overlapping steel panel sections 10, 12. In this example, electrodes 20, 28 are identical so only the welding face features of electrode 20 have been identified with numerals. The intention is that for welding of steel, indentation is largely restricted to the central area of the electrode primarily established by the size of the central plateau 42 and its groove 46. They provide sufficient penetration and contact with the steel workpieces to form a fused steel spot weld pool 60 for a good joint between the workpieces.

Figure 6:
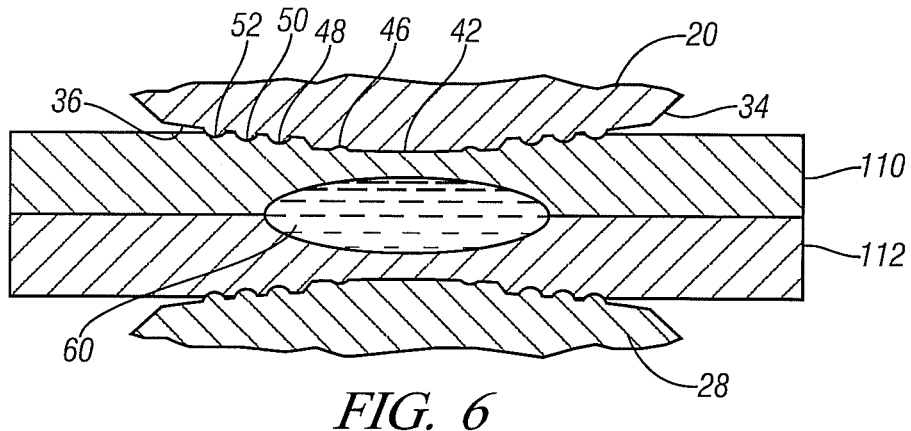
FIG. 6 is an elevational view in cross-section of two opposing spot weld electrodes engaging and forming a weld nugget in two overlying aluminum sheets each 2.0 mm thick. The electrodes each have the face design illustrated in FIGS. 2-4.

In FIG. 6, the same welding electrodes 20, 28 are engaging overlapping aluminum panel sections 110, 112. For welding of the thicker aluminum workpieces, it is expected that the central plateau 42 and groove 46 and much of the remaining electrode face, including protrusions 48, 50, 52 will contact the aluminum sheet. These additional electrode face features provide additional face elements that produce high levels of plastic strain on the surface of the aluminum workpieces 110, 112 that disrupts the oxide film and establishes excellent electrical contact with the workpieces. Typical electrode weld faces for spot welding aluminum have radii of curvature greater than 25 mm, which establishes a maximum level of plastic strain on the aluminum surface of less than about 5%. The additional contact afforded by protrusions 48, 50, 52 increases the level of plastic strain on the surface to greater than 20% and provides sufficient oxide disruption over a large enough area that excellent contact is established with the aluminum workpieces to form a fused aluminum spot weld pool 62 for a good joint between the workpieces.

An additional requirement of the electrode geometry is that the electrode weld face retains a sufficient amount of its original geometry to allow it to perform its primary function, i.e., produce structural welds in the sheet material, for a large number of weld spots. Electrode weld faces, and particularly those designed to spot weld aluminum, are designed to control the current density during the welding process. Radiused electrode weld faces have been used to provide a high initial current density by providing a small contact area between the sheet surface and electrode. The base radii of curvature for the weld face and the projecting central plateau have been chosen in concert with the size of the plateau to provide a geometry that will approximate a 25 mm spherical radius (FIG. 4) after moderate wear in welding aluminum. Similarly, the central (large radius) projection approximates the ball nose flat locally for welding of steel.

As a variation to the design shown in FIGS. 2-6, the electrode could be fabricated with the same base radii and projecting central plateau, but with a generalized roughened surface (plateau and/or dome surfaces) in place of the discrete intruding and projecting "local" rings. In this embodiment the roughened surfaces are characterized by randomly distributed craters with peak to valley dimensions (roughness) in the range of 5 to 30 micrometers and with substantially the same range of peak to peak spacing. For example, grit blasting process produces a random surface roughness with a nearly perfect Gaussian distribution. Although such roughness features are smaller than groove 46 and protrusions 48, 50, and 52, the craters permit the plateau and dome face 36 to penetrate oxide films and contamination on a part at a weld location.

In another embodiment of the invention, electrode and dressing blade designs are provided that simultaneously provide the benefits of a dressed concentric protrusion electrode, i.e., good alignment, electrode surface cleanliness, low contact resistance, reduced surface expulsion, etc., with the additional benefits of extended electrode life, improved ability to spot weld steel sheet as well as aluminum sheet, and ease of manufacture. To achieve this, standard electrode dressing blades are modified so that they cut a concentric terraced structure, see FIG. 7, instead of the concentric raised protrusions. This structure is achieved by putting a round plateau 142, centered on the axis 138 of the electrode, and a series of concentric, increasing radii, round terraces 148, 150, 152, 154 into the face of the dressing blade.

Figure 7:
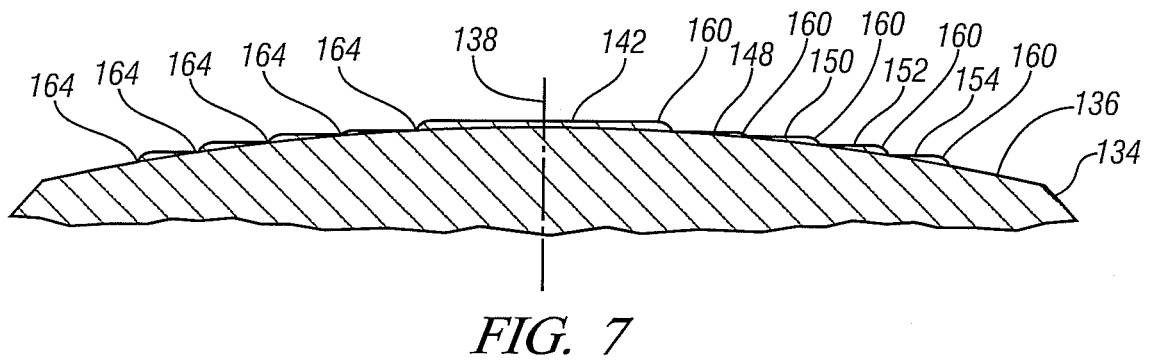
FIG. 7 is an elevational view in cross-section of a second embodiment of a spot welding electrode face. This electrode face design is devised for effective penetration and welding of light metal sheet material. The face design permits effective welding and effective re-dressing with minimal removal of electrode face material.

Examination of the new design in FIG. 7 reveals that the texture is provided by the rounded corners 160 of the plateau 142 and individual terraces 148, 150, 152, 154. The plateau and terraces themselves may be planar, slightly conical, or have a slight (>25 mm) curvature to them. The rounded corners 160 should suffer much less deformation during spot welding of aluminum and especially steel, since the area of initial contact would be between the sheet surface and central area of the uppermost terrace, and not a texture feature such as a ridge or terrace corner. This difference should significantly extend the life of the texture features and, thus, extend electrode life.

All features on the weld face, i.e., the rounded corners, must be designed so that the electrode can be lifted from the sheet material after welding without becoming locked into the sheet surface. For this reason, all these features should have no backdraft or negative draft relative to the longitudinal axis.

To weld aluminum robustly and provide good mechanical performance, the terraces/plateaus must have two essential design features. First, the overall curvature of the weld face should be ~25 mm (20 mm to 40 mm). Numerous tests have shown that this provides a very effective curvature to insure robust welding performance for aluminum spot welding. It provides good performance welding off-normal and with gaps between the sheets. Second, the corners of the terraces form depressions in the aluminum sheet. To prevent these from becoming severe stress concentrators, they should not be sharp corners, but rounded. Tests have shown that ridges as sharp as 0.2 mm in radius do not act as stress concentrators, thus the terrace corners may be shaped with a radius of about 0.2 mm to about 0.5 mm. FIG. 7 shows sharp corners 164 where one terrace meets another. These would not form stress risers since they would produce raised areas on the sheet surface.

To weld steel, the center plateau or flat area must be large enough to contain the weld nugget produced between steel sheets. In general, this center flat area is about 4.9 mm for spot welding electrodes. For welding of lighter gauge steel materials, this center region can be reduced in size.

This new proposed electrode geometry has a significant advantage over earlier designs in terms of manufacturing, since for this design a simple, pre-dressed grinding wheel can be used to cut the dressing blade. To achieve this, the slope along the radial direction (radial slope) of any portion of the electrode face should be negative or only slightly positive moving away from the center of the electrode. This will insure that rotation of the blade about the electrode face will not cause interference between the cut electrode surface and trailing edge of the blade. Any slight positive slope along the radial direction will require the introduction of a "relief" angle to the trailing edge of the cutting blade to prevent interference between the rotating blade and the cut surface. The prior electrode examples (w/ ridges) provide positive slope along the inside (relative to the electrode center) edge of the ridge. Sine waves, saw-tooth waves and other designs would also provide a positive slope moving away from the electrode center. Besides being easier to manufacture, the new terraced design should also help with chip removal, since there are no small grooves or other features in the blade design to trap chips.

The invention claimed is:

1. An electrode for forming electrical resistance spot welds in any of a steel workpiece, an aluminum alloy workpiece, or a magnesium alloy workpiece, the electrode comprising a body with a dome face at one end of the body for engagement with a surface of the workpiece being welded, the dome face comprising:
   a dome face surface;
   a round plateau centered on the dome face surface, the round plateau having a plateau surface raised above the dome face surface and a circumference such that the dome face surface surrounds the round plateau, wherein the dome face surface and the plateau surface, taken together, define an overall spherical radius of curvature of the dome face, and wherein the plateau surface is planar or has a spherical radius of curvature that is greater than the overall spherical radius of curvature of the dome face; and
   at least one surface feature elevated above or depressed below the dome face surface;
   wherein the round plateau is sized and shaped to contact and indent into a steel alloy workpiece to form electrical resistance spot welds in the steel alloy workpiece and the combination of the round plateau and the at least one surface feature is sized, shaped, and located to contact and indent into an aluminum alloy workpiece or a magnesium alloy workpiece to form electrical resistance spot welds in the aluminum alloy workpiece or the magnesium alloy workpiece.

2. An electrode as recited in claim 1 in which the spherical radius of curvature of the plateau surface is larger than a spherical radius of curvature of the dome face surface.

3. An electrode as recited in claim 1 in which the round plateau and the dome face surface each have diameters in a plan view of the dome face, and wherein the diameter of the round plateau is not greater than half of the diameter of the dome face surface.

4. An electrode as recited in claim 1 in which at least one of the plateau surface and the dome face surface is roughened with craters having peak to valley dimensions ranging from five to thirty micrometers.

5. An electrode as recited in claim 1 in which the dome face surface comprises at least one circular surface feature concentric with the round plateau.

6. An electrode as recited in claim 5 in which the at least one circular surface feature is an upwardly protruding rounded arc and there are two or more such concentric surface features on the dome face surface.

7. An electrode as recited in claim 1 in which the round plateau has at least one circular groove in and depressed below the plateau surface.

8. An electrode as recited in claim 1 in which the dome face surface comprises at least two concentric, round, and progressively lower terraces with a first terrace descending from a side surface of the round plateau.

9. An electrode for forming electrical resistance spot welds in any of a steel alloy workpiece, an aluminum alloy workpiece, or a magnesium alloy workpiece, the electrode comprising a body with a dome face at one end of the body, the dome face being configured to contact and indent into a surface of the workpiece being welded, the dome face comprising:
   a dome face surface having a circumference;
   a round plateau centered on the dome face surface, the round plateau having a plateau surface raised above the dome face surface and a circumference within the circumference of the dome face surface, wherein the dome face surface and the plateau surface, taken together, define an overall spherical radius of curvature of the dome face, and wherein the plateau surface is planar or has a spherical radius of curvature that is greater than the overall spherical radius of curvature of the dome face; and
   at least two round, concentric terraces of increasing diameter and decreasing height on the dome face surface that extend from a side of the round plateau toward the circumference of the dome face surface, wherein a first terrace is contiguous with the side of the round plateau and a second terrace is contiguous with a side of the first terrace, and each additional terrace is contiguous with the inward terrace thereof.

10. An electrode as recited in claim 9 in which the round plateau and the round, concentric terraces have rounded outer edges.

11. An electrode as recited in claim 9 in which the round plateau and the round, concentric terraces have rounded outer edges with a curvature radius of about 0.2 mm to about 0.5 mm.

12. An electrode as recited in claim 1 in which the overall spherical radius of curvature of the dome face ranges from 20 mm to 40 mm, and the plateau surface has a spherical radius of curvature that is larger than the overall spherical radius of curvature of the dome face.

13. An electrode as recited in claim 1 in which the dome face surface includes round concentric protrusions that are elevated above the dome face surface and surround the round plateau, wherein the round concentric protrusions are raised about 0.12 mm above the dome face surface and the plateau surface is raised about 0.24 mm above the dome face surface.

14. An electrode as recited in claim 9 in which the overall spherical radius of curvature of the dome face ranges from 20 mm to 40 mm, and the plateau surface has a spherical radius of curvature that is larger than the overall spherical radius of curvature of the dome face.

* * * * *